United States Patent
Ma et al.

(10) Patent No.: US 12,172,739 B2
(45) Date of Patent: Dec. 24, 2024

(54) PATH PLANNING SYSTEM AND METHOD FOR SEA-AERIAL COOPERATIVE UNDERWATER TARGET TRACKING

(71) Applicant: WUHAN UNIVERSITY OF TECHNOLOGY, Wuhan (CN)

(72) Inventors: Yong Ma, Wuhan (CN); Xiang Yin, Wuhan (CN); Xinping Yan, Wuhan (CN); Lei Zhang, Wuhan (CN)

(73) Assignee: WUHAN UNIVERSITY OF TECHNOLOGY, Wuhan (CN)

( * ) Notice: Subject to any disclaimer, the term of this patent is extended or adjusted under 35 U.S.C. 154(b) by 289 days.

(21) Appl. No.: 17/732,506

(22) Filed: Apr. 28, 2022

(65) Prior Publication Data
US 2022/0371709 A1 Nov. 24, 2022

Related U.S. Application Data

(63) Continuation of application No. PCT/CN2021/108070, filed on Jul. 23, 2021.

(30) Foreign Application Priority Data

May 21, 2021 (CN) .......................... 202110562485.3

(51) Int. Cl.
*B63G 8/00* (2006.01)
*G05D 1/00* (2006.01)

(52) U.S. Cl.
CPC ........... *B63G 8/001* (2013.01); *G05D 1/0094* (2013.01); *G05D 1/0206* (2013.01); *B63G 2008/008* (2013.01)

(58) Field of Classification Search
CPC .............. B63G 8/001; B63G 2008/008; B63G 2008/002; G05D 1/0094; G05D 1/0206
See application file for complete search history.

(56) References Cited

U.S. PATENT DOCUMENTS

| | | | |
|---|---|---|---|
| 2017/0059333 A1 | 3/2017 | Ward | |
| 2020/0180740 A1* | 6/2020 | Christ | B63B 23/34 |
| 2022/0301302 A1* | 9/2022 | Murphy | A01K 97/00 |

FOREIGN PATENT DOCUMENTS

| | | |
|---|---|---|
| CN | 108318039 A | 7/2018 |
| CN | 109917817 A | 6/2019 |

(Continued)

OTHER PUBLICATIONS

"Xuekuan Yang et al., Distributed optimal consensus with obstacle avoidance algorithm of mixed-order UAVs-USVs-UUVs systems, 2020, College of Automation Harbin Engineering University, Harbin 150001" (Year: 2020).*

*Primary Examiner* — Joan T Goodbody
*Assistant Examiner* — Michael Lukon
(74) *Attorney, Agent, or Firm* — Jeenam Park (57) ABSTRACT

Disclosed is path planning system and method for sea-aerial cooperative underwater target tracking, the method comprises: obtaining the position information of a detection target, carrying out a first path planning along a channel of sea surface monitoring device according to the position information of the detection target; carrying out a second path planning along the channel of sea surface monitoring device according to the water surface navigation map and its own position information, constructing an underwater obstacle map; performing a third path planning according to the underwater obstacle map, and tracking to the position of the detection target to complete the tracking task. This disclosure adopts the collaborative optimization of several clusters to reduce the number of iterations and improve the optimization efficiency, making the path planning reasonable, as a result, the target position can be quickly tracked, and the autonomous collaborative tracking capability is improved.

7 Claims, 3 Drawing Sheets obtaining the position information of a detection target, carrying out a first path planning along a channel of sea surface monitoring device according to the position information of the detection target, and constructing a water surface navigation map including the target position information and information of all obstacles in the channel of sea surface monitoring device, and transmitting the water surface navigation map to the cluster of sea surface monitoring devices — S1 carrying out a second path planning along the channel of sea surface monitoring device according to the water surface navigation map and its own position information, reaching an adjacent area of the detection target, detecting the underwater environment of the adjacent area, constructing an underwater obstacle map, and transmitting the underwater obstacle map to the cluster of underwater monitoring devices — S2 performing a third path planning according to the underwater obstacle map, and tracking to the position of the detection target to complete the tracking task — S3

(56) References Cited

FOREIGN PATENT DOCUMENTS

| | | | | |
|---|---|---|---|---|
| CN | 109933067 A | * | 6/2019 | |
| CN | 111045453 A | | 4/2020 | |
| CN | 111381605 A | | 7/2020 | |
| WO | WO-2020181934 A1 | * | 9/2020 | ............. G06N 3/006 |

* cited by examiner

PATH PLANNING SYSTEM AND METHOD FOR SEA-AERIAL COOPERATIVE UNDERWATER TARGET TRACKING

CROSS-REFERENCE TO RELATED APPLICATIONS

This application is a continuation of International Patent Application No. PCT/CN2021/108070, with an international filing date of Jul. 23, 2021, designating the United States, which is based on Chinese Patent Applications No. 2021105624853, filed on May 21, 2021. The contents of these specifications are incorporated herein by reference.

FIELD OF THE DISCLOSURE

The disclosure relates to the technical field of path planning technology for unmanned platform, in particular to path planning system and method for sea-aerial cooperative underwater target tracking.

BACKGROUND

When conducting tracking tasks in unidentified waters, relying on surface vessel tracking alone is very inefficient. Unmanned surface vessels (USVs) sail on the water surface and have a small detection area. Especially when navigating in complex waters, it is very dependent on timely obstacle avoidance, the process of path planning is complicated, and the ability to identify the optimal channel in the overall sea area is very limited. At the same time, the USVs have poor concealment and weak ability to track underwater targets.

The coordination of sea-aerial monitoring equipment refers to the process that the sea and aerial monitoring equipment system cooperates with each other as a whole in the process of perceiving the environment, planning paths, controlling behaviors, and issuing decisions. At the same time, it also processes and operates independently to complete the overall design goal. Aerial monitoring devices navigate in the air and have the characteristics of flexibility, fewer obstacles, and wide detection field of vision, and can efficiently complete the task of detecting the surface channel environment; unmanned underwater vehicles (UUVs) can navigate underwater with strong concealment, but they are only suitable for short-range channel detection and planning due to the complex underwater navigation environment and low environmental detection efficiency;

USVs navigate on the water surface, and the surface navigation environment is easier to detect than the underwater environment, which is conducive to long-distance path detection planning. At the same time, USVs are relatively stable and have strong load capacity, and can carry other types of unmanned aerial vehicles. However, in the existing technology, there are problems such as low detection efficiency and inaccurate path planning in the coordination of sea and aerial monitoring equipment. Therefore, how to use the coordination of aerial monitoring devices, USVs, and UUVs for accurate target tracking is an urgent problem to be solved.

SUMMARY

The purpose of this disclosure is to provide a path planning system and method for sea-aerial cooperative underwater target tracking, to solve the technical problem that the aerial monitoring equipment, USVs, and UUVs cannot cooperate to carry out accurate target tracking in the prior art.

This disclosure provides a path planning system for sea-aerial cooperative underwater target tracking, comprising a cluster of aerial monitoring devices, a cluster of sea surface monitoring devices, and a cluster of underwater monitoring devices, wherein:
  the cluster of aerial monitoring devices is used to obtain the position information of a detection target, carry out a first path planning along a channel of sea surface monitoring device according to the position information of the detection target, construct a water surface navigation map including the target position information and information of all obstacles in the channel of sea surface monitoring device, and transmit the water surface navigation map to the cluster of sea surface monitoring devices;
  the cluster of sea surface monitoring devices is used to carry out a second path planning along the channel of sea surface monitoring device according to the water surface navigation map and its own position information, reaching an adjacent area of the detection target, and to detect the underwater environment of the adjacent area, construct an underwater obstacle map, and transmit the underwater obstacle map to the cluster of underwater monitoring devices;
  the cluster of underwater monitoring devices is used to perform a third path planning according to the underwater obstacle map, and track to the position of the detection target to complete the tracking task.

This disclosure also provides a path planning method for sea-aerial cooperative underwater target tracking, which is based on the path planning system for sea-aerial cooperative underwater target tracking, comprising:
  obtaining the position information of a detection target, carrying out a first path planning along a channel of sea surface monitoring device according to the position information of the detection target, and constructing a water surface navigation map including the target position information and information of all obstacles in the channel of sea surface monitoring device, and transmitting the water surface navigation map to the cluster of sea surface monitoring devices;
  carrying out a second path planning along the channel of sea surface monitoring device according to the water surface navigation map and its own position information, reaching an adjacent area of the detection target, detecting the underwater environment of the adjacent area, constructing an underwater obstacle map, and transmitting the underwater obstacle map to the cluster of underwater monitoring devices;
  performing a third path planning according to the underwater obstacle map, and tracking to the position of the detection target to complete the tracking task.

Compared with the prior art, the beneficial effect of the technical solution proposed by this disclosure is: firstly, the position information of the detection target is effectively acquired through the cluster of aerial monitoring devices, and the first path planning is carried out along the channel of sea surface monitoring devices to conduct navigation, and detecting water obstacles during the navigation process to build a water surface navigation map and feedback all obstacle information in the channel of sea surface monitoring device; then, using the cluster of sea surface monitoring devices to receive the water surface navigation map transmitted by the cluster of aerial monitoring devices, and carrying out the second path planning along the channel of sea surface monitoring device until it reaches the adjacent area of the detected target based on the obstacle information, the target position information, and its own position information of water surface navigation map, and then the underwater environment in the adjacent area is further detected to construct and transmit the underwater obstacle map; finally, using the cluster of underwater monitoring devices to receive the underwater obstacle map, continuing the third path planning to track to the position of the detection target based on the underwater obstacle information in the adjacent area of underwater obstacle map. In summary, this disclosure adopts the collaborative optimization of the cluster of aerial monitoring devices, the cluster of sea surface monitoring devices, and the cluster of underwater monitoring devices to reduce the number of iterations and improve the optimization efficiency, making the path planning reasonable, as a result, the target position can be quickly tracked, and the autonomous collaborative tracking capability is improved.

BRIEF DESCRIPTION OF THE DRAWINGS

Accompanying drawings are for providing further understanding of embodiments of the disclosure. The drawings form a part of the disclosure and are for illustrating the principle of the embodiments of the disclosure along with the literal description. Apparently, the drawings in the description below are merely some embodiments of the disclosure, a person skilled in the art can obtain other drawings according to these drawings without creative efforts. In the figures.

DETAILED DESCRIPTION OF PREFERRED EMBODIMENTS

This disclosure provides a path planning system for sea-aerial cooperative underwater target tracking, comprising a cluster of aerial monitoring devices, a cluster of sea surface monitoring devices, and a cluster of underwater monitoring devices, wherein:

the cluster of aerial monitoring devices is used to obtain the position information of a detection target, carry out a first path planning along a channel of sea surface monitoring device according to the position information of the detection target, construct a water surface navigation map including the target position information and information of all obstacles in the channel of sea surface monitoring device, and transmit the water surface navigation map to the cluster of sea surface monitoring devices. It is understandable that the cluster of aerial monitoring devices is generally a drone cluster;

the cluster of sea surface monitoring devices is used to carry out a second path planning along the channel of sea surface monitoring device according to the water surface navigation map and its own position information, reaching an adjacent area of the detection target, and to detect the underwater environment of the adjacent area, construct an underwater obstacle map, and transmit the underwater obstacle map to the cluster of underwater monitoring devices. It is understandable that the cluster of sea surface monitoring devices is generally a cluster of unmanned boats;

the cluster of underwater monitoring devices is used to perform a third path planning according to the underwater obstacle map, and track to the position of the detection target to complete the tracking task. It can be understood that the cluster of underwater monitoring devices is generally a cluster of underwater vehicles.

In this disclosure, the position information of the detection target is effectively acquired through the cluster of aerial monitoring devices, and the first path planning is carried out along the channel of sea surface monitoring devices to conduct navigation, and detecting water obstacles during the navigation process to build a water surface navigation map and feedback all obstacle information in the channel of sea surface monitoring device; using the cluster of sea surface monitoring devices to receive the water surface navigation map transmitted by the cluster of aerial monitoring devices, and carrying out the second path planning along the channel of sea surface monitoring device until it reaches the adjacent area of the detected target based on the obstacle information, the target position information, and its own position information of water surface navigation map, and then the underwater environment in the adjacent area is further detected to construct and transmit the underwater obstacle map; using the cluster of underwater monitoring devices to receive the underwater obstacle map, continuing the third path planning to track to the position of the detection target based on the underwater obstacle information in the adjacent area of underwater obstacle map.

Figure 1:
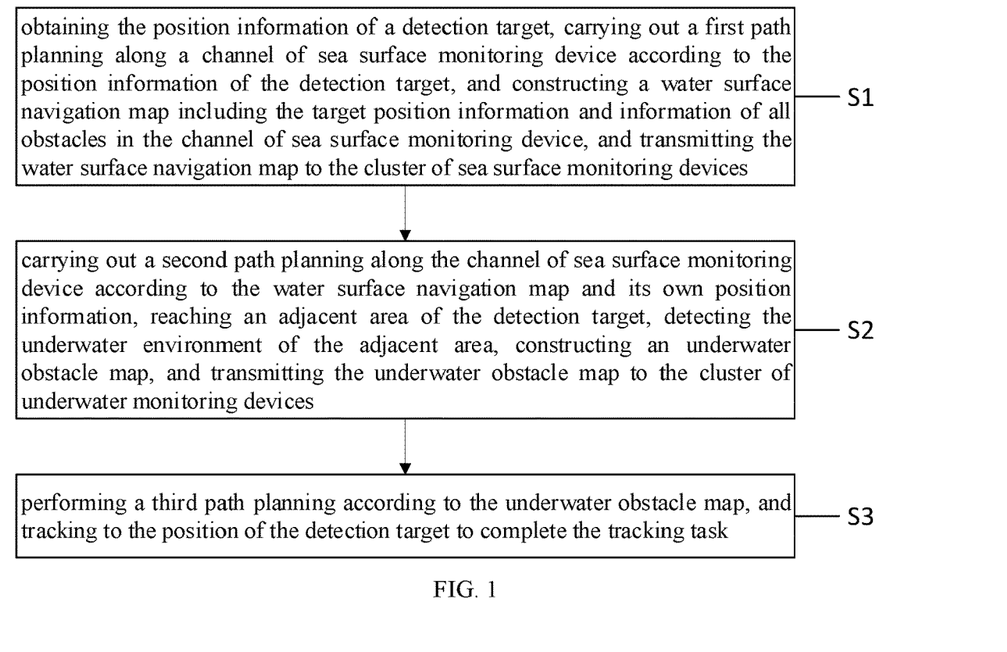
FIG. 1 is a schematic flowchart of an embodiment of a path planning method for sea-aerial cooperative underwater target tracking provided by this disclosure.

As shown in FIG. 1, this disclosure also provides a path planning method for sea-aerial cooperative underwater target tracking, comprising:

S1 obtaining the position information of a detection target, carrying out a first path planning along a channel of sea surface monitoring device according to the position information of the detection target, and constructing a water surface navigation map including the target position information and information of all obstacles in the channel of sea surface monitoring device, and transmitting the water surface navigation map to the cluster of sea surface monitoring devices;

S2 carrying out a second path planning along the channel of sea surface monitoring device according to the water surface navigation map and its own position information, reaching an adjacent area of the detection target, detecting the underwater environment of the adjacent area, constructing an underwater obstacle map, and transmitting the underwater obstacle map to the cluster of underwater monitoring devices;

S3 performing a third path planning according to the underwater obstacle map, and tracking to the position of the detection target to complete the tracking task.

In this disclosure, the position information of the detection target is effectively acquired through the cluster of aerial monitoring devices, and the first path planning is carried out along the channel of sea surface monitoring devices to conduct navigation, and detecting water obstacles during the navigation process to build a water surface navigation map and feedback all obstacle information in the channel of sea surface monitoring device; using the cluster of sea surface monitoring devices to receive the water surface navigation map transmitted by the cluster of aerial monitoring devices, and carrying out the second path planning along the channel of sea surface monitoring device until it reaches the adjacent area of the detected target based on the obstacle information, the target position information, and its own position information of water surface navigation map, and then the underwater environment in the adjacent area is further detected to construct and transmit the underwater obstacle map; using the cluster of underwater monitoring devices to receive the underwater obstacle map, continuing the third path planning to track to the position of the detection target based on the underwater obstacle information in the adjacent area of underwater obstacle map.

Figure 2:
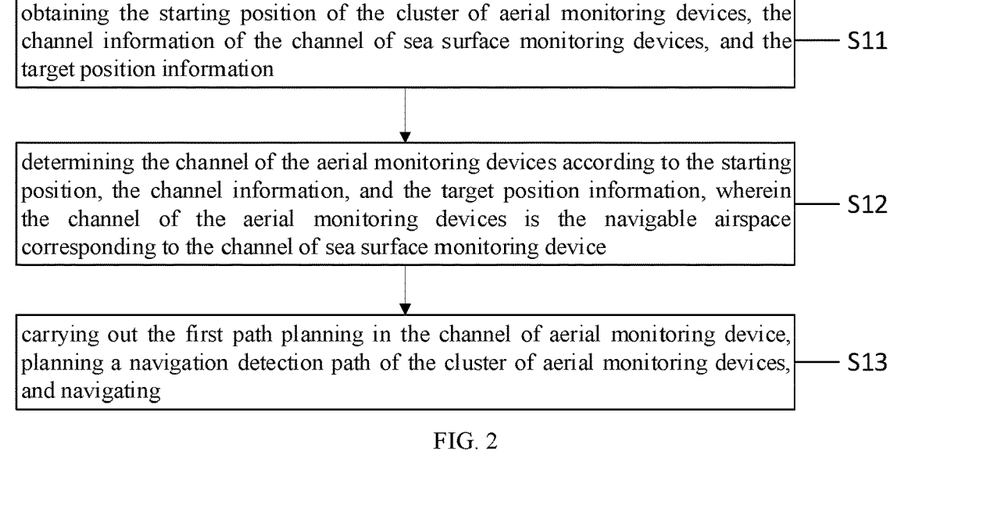
FIG. 2 is a schematic flowchart of an embodiment of step S1 in FIG. 1 provided by this disclosure.

As a preferred embodiment, FIG. 2 is a schematic flowchart of an embodiment of step S1 in FIG. 1 provided by this disclosure. Step S1 includes the following steps:

S11 obtaining the starting position of the cluster of aerial monitoring devices, the channel information of the channel of sea surface monitoring devices, and the target position information;

S12 determining the channel of the aerial monitoring devices according to the starting position, the channel information, and the target position information, wherein the channel of the aerial monitoring devices is the navigable airspace corresponding to the channel of sea surface monitoring device;

S13 carrying out the first path planning in the channel of aerial monitoring device, planning a navigation detection path of the cluster of aerial monitoring devices, and navigating.

Specifically, obtaining the starting position of the cluster of sea surface monitoring devices, the channel information of the channel of sea surface monitoring devices, and the target position information; determining the channel of the aerial monitoring devices according to the starting position, the channel information, and the target position information, wherein the channel of the aerial monitoring devices is the navigable airspace corresponding to the channel of sea surface monitoring device; carrying out the first path planning in the channel of aerial monitoring device, planning a navigation detection path of the cluster of aerial monitoring devices, and navigating.

Figure 3:
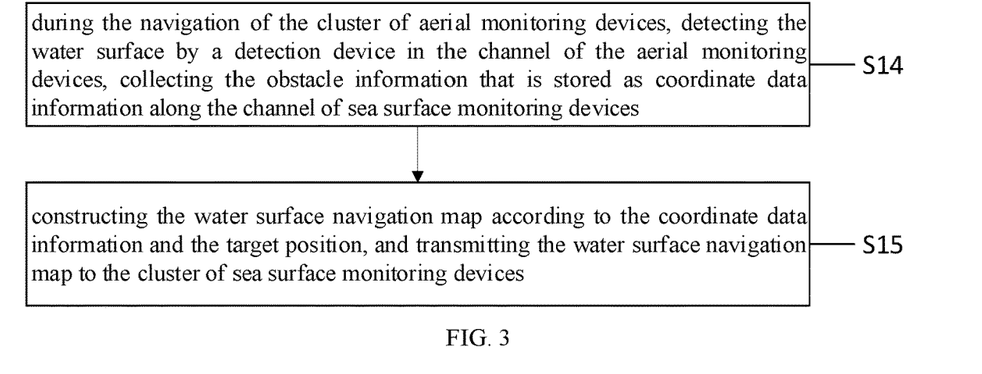
FIG. 3 is another schematic flowchart of an embodiment of step S1 in FIG. 1 provided by this disclosure.

As shown in FIG. 3, which is another schematic flowchart of an embodiment of step S1 in FIG. 1 provided by this disclosure, step S1 includes:

S14 during the navigation of the cluster of aerial monitoring devices, detecting the water surface by a detection device in the channel of the aerial monitoring devices, collecting the obstacle information that is stored as coordinate data information along the channel of sea surface monitoring devices;

S15 constructing the water surface navigation map according to the coordinate data information and the target position, and transmitting the water surface navigation map to the cluster of sea surface monitoring devices.

Specifically, during the navigation process, the cluster of aerial monitoring devices collects the obstacle information along the road through the detection device, stores it as coordinate data information, and transmits the complete obstacle coordinate information to the cluster of sea surface monitoring devices.

Figure 4:
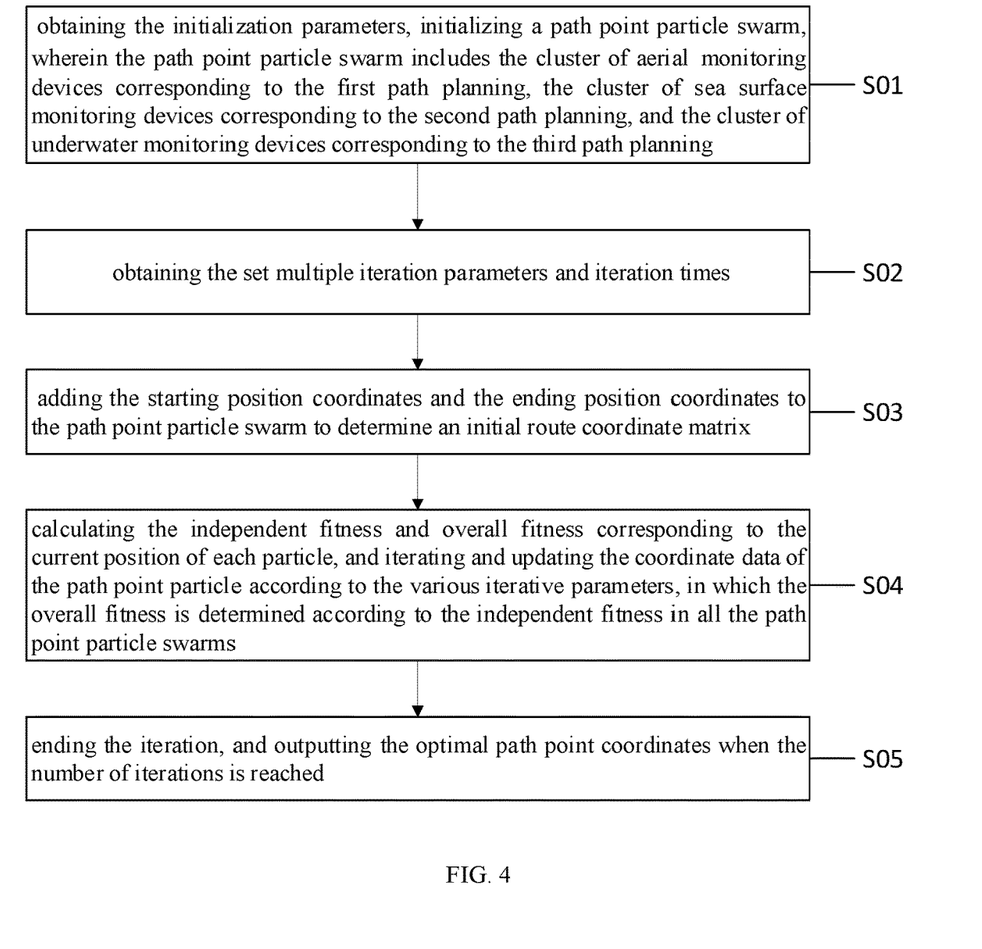
FIG. 4 is a schematic flowchart of an embodiment of path planning provided by this disclosure.

Specifically, as shown in FIG. 4, the path planning includes the following steps:

S01 obtaining the initialization parameters, initializing a path point particle swarm, wherein the path point particle swarm includes the cluster of aerial monitoring devices corresponding to the first path planning, the cluster of sea surface monitoring devices corresponding to the second path planning, and the cluster of underwater monitoring devices corresponding to the third path planning;

S02 obtaining the set multiple iteration parameters and iteration times;

S03 adding the starting position coordinates and the ending position coordinates to the path point particle swarm to determine an initial route coordinate matrix;

S04 calculating the independent fitness and overall fitness corresponding to the current position of each particle, and iterating and updating the coordinate data of the path point particle according to the various iterative parameters, in which the overall fitness is determined according to the independent fitness in all the path point particle swarms;

S05 ending the iteration, and outputting the optimal path point coordinates when the number of iterations is reached.

specifically, an embodiment of this disclosure firstly performs effective particle initialization, and then performs collaborative optimization between particle swarms through independent fitness and overall fitness to realize iterative update to complete the optimal path planning.

It should be noted that, in the path planning algorithm of this disclosure, aerial monitoring devices are used to detect the target water area, and the detected obstacle position information is combined with the existing chart and channel information as the navigation environment of the USVs. Then, a cooperative particle swarm algorithm is used for long-distance optimal tracking path planning of cluster of USVs. After the cluster of sea surface monitoring devices reaches the preset underwater target near the waters, the underwater area detection is performed to integrate the known underwater environment information as the navigation environment of the underwater vehicles; finally, the cooperative particle swarm algorithm is used to carry out the short-distance underwater tracking path planning of the underwater vehicles. Compared with the homogeneous unmanned equipment cluster tracking target, this disclosure effectively detects unknown navigation waters, and can find the optimal navigation path, and the planning process is more reasonable; the efficiency of cooperative tracking of long-distance surface navigation and short-distance underwater navigation is higher. At the same time, this disclosure uses the method of collaborative optimization of multiple particle swarms, which reduces the mutual interference of particles, avoids the optimization falling into a local optimal solution, improves the optimization efficiency, and reduces the number of iterations and time.

It should be noted that, in the setting of the number of cooperative particle swarms, the number of cooperative particle swarms is the number of vehicles. In the iterative optimization process, different cooperative particle swarms are independently optimized according to the class of the vehicle. In the process of collaborative optimization, each vehicle path is regarded as an independent optimization target, and different particle swarms are independently updated iteratively; at the same time, the penalty function information of each swarm is shared and included in the calculation of the overall fitness, and the fitness is taken as overall optimization goal.

Specifically, the initialization parameters include number of cooperative particle swarms, particle swarm's size, particle dimension and initial velocity; this disclosure completes effective particle initialization by setting various initialization parameters.

the various iterative parameters include channel space range, inertia factor, individual learning factor and group learning factor; this disclosure completes effective particle initialization by setting various iteration parameters.

In a specific embodiment of the present invention, the specific steps of path planning are as follows:

(1) setting the number of cooperative point particle swarm nn, the particle swarm size P, the particle dimension dim, and the initial velocity v, and then initialize the path point particle swarm;

(2) setting the channel space range, the inertia factor, the learning factors c1 and c2, and the number of iterations g;

(3) adding the starting position coordinates and the ending position coordinates to the path point particle swarm to form an initial route coordinate matrix;

(4) determining the cost function first, then calculating the fitness value, and iteratively updating the coordinate data of the path point particle according to the fitness value;

(5) ending the iteration, and outputting the optimal path point coordinates when the number of iterations is reached to complete the path planning of the unmanned device.

Figure 5:
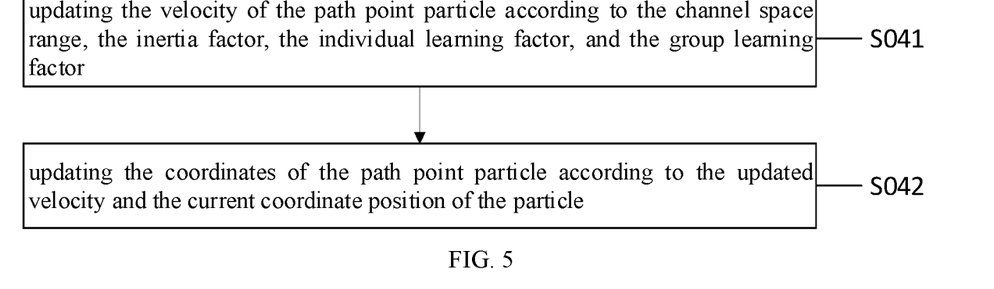
FIG. 5 is a schematic flowchart of an embodiment of step S04 in FIG. 4 provided by this disclosure.

Specifically, as shown in FIG. 5, step S04 includes the following steps:

S041 updating the velocity of the path point particle according to the channel space range, the inertia factor, the individual learning factor, and the group learning factor;

S042 updating the coordinates of the path point particle according to the updated velocity and the current coordinate position of the particle.

In this embodiment, the velocity is first updated through the channel space range, inertia factor, individual learning factor, and group learning factor, and then the corresponding coordinates are updated according to the updated velocity and the current coordinate position of the particle.

In a specific embodiment, the velocity of updating the path point particle (taking the speed and position update formula in the x direction as an example) is expressed by the following formula:

$$vx = \omega \times vx + c1 \times \text{rand}(0,1) \times (pbest - posx) + c2 \times \text{rand}(0,1) \times (gbest - posx);$$

Updating the coordinates of the path point particle (taking the velocity and position update formula in the x direction as an example), expressed by the following formula:

$$posx = posx + vx;$$

where vx is the velocity of the particle in the x-axis direction; posx is the position of the particle in the x-axis direction; ω is the inertia factor; c1 is the individual learning factor; c2 is the group learning factor; pbest is the optimal particle position in the x-axis direction of the individual; gbest is the optimal particle position in the x-axis direction of the swarm; rand (0,1) is a random number from 0 to 1. It should be noted that each particle of the aerial monitoring devices group and the surface boat group has a position and velocity in two directions (x, y axis directions), and the submarine group has a position and velocity in three directions (x, y, z-axis direction), the velocity and position of each particle of each particle swarm are updated at each iteration.

Preferably, the inertia factor decreases uniformly with the increase of the number of iterations, which is expressed by the following formula:

$$\omega_t = \omega_{t-1} - \frac{\omega_{max} - \omega_{min}}{g}$$

where t represents the current iteration number, $\omega_t$ represents the inertia factor corresponding to the current iteration number, $\omega_{t-1}$ represents the inertia factor corresponding to the previous iteration number, $\omega_{max}$ represents the maximum value corresponding to the preset inertia factor, $\omega_{min}$ represents the minimum value corresponding to the preset inertia factor, g represents the preset constant.

In a specific embodiment, the iterative update of the velocity and the position is realized by the gradient descent update of the inertia factor.

Figure 6:
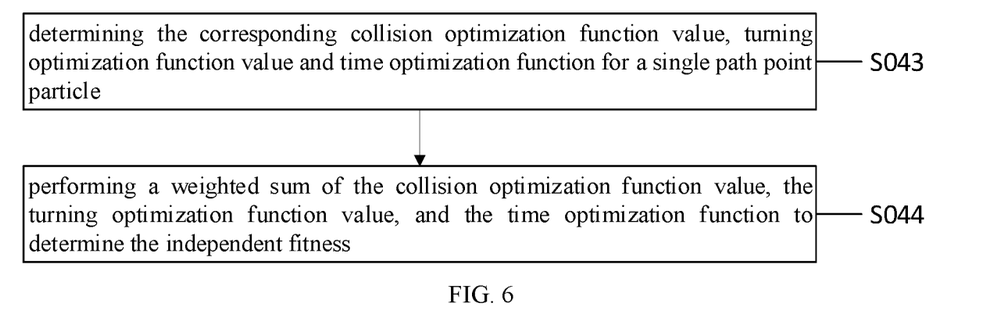
FIG. 6 is a schematic flowchart of an embodiment of calculating independent fitness provided by this disclosure.

Specifically, as shown in FIG. 6, the calculation of the independent fitness includes:

S043 determining the corresponding collision optimization function value, turning optimization function value and time optimization function for a single path point particle;

S044 performing a weighted sum of the collision optimization function value, the turning optimization function value, and the time optimization function to determine the independent fitness.

In the embodiment, by setting the collision optimization function value, the turning optimization function value and the time optimization function, the independent fitness is obtained, and the individual path point particle is independently optimized, and at the same time, combined with the overall fitness between particle swarms, different collaborative particle swarms are independently optimized.

Preferably, the calculation process of the turning optimization function value includes:

for a single path point particle, calculating the path angle, the first distance, and the limit turning radius according to every three adjacent path points, which are respectively expressed by the following formulas:

$$\alpha = \arccos \frac{l_1 + l_2 - l_3}{2l_1 \cdot l_2}$$

$$l = \min(l_1, l_2)$$

$$\rho = l \cdot \tan \frac{\alpha}{2}$$

where α represents the path angle determined by every three adjacent path points, l represents the first distance, $l_1$ represents the distance between the first two path points, $l_2$ represents the distance between the last two path points, $l_3$ represents the distance between the first path point and the third path point, ρ represents the limit turning radius, which is the maximum inscribed circle radius of the first distance l;

according to the limit turning radius and the minimum turning radius of the sea surface monitoring device, determining the turning optimization function value, which is expressed by the following formula:

$$tu(p_{k-1}, p_k, p_{k+1}) = \begin{cases} 1 & \rho \geq R \\ 0 & \rho < R \end{cases}$$

where $tu(p_{k-1}, p_k, p_{k+1})$ represents the turning optimization function value, $P_{k-1}$, $P_k$, and $P_{k+1}$ represent three adjacent path points respectively, P represents the limit turning radius, R represents the minimum turning radius, for a single path point particle, if at least one of the turning optimization function values takes a value of 0, the turning optimization function value corresponding to a single path point particle takes 0;

for a single path point particle, the corresponding time optimization function is expressed by the following formula:

$$l_{ij} = \sum_{k=1}^{dim+1} l_{ijk};$$

$$l_i = \min(l_{ij}), j = 1, \ldots, P$$

$$t_i = \frac{l_i}{v_i}; tim = \frac{\sum_{i=1}^{nn} t_i}{nn};$$

where $l_{ijk}$ represents the distance between the i-th particle swarm, the j-th particle, and the k-th group of adjacent path points; $l_{ij}$ represents the total path length of the i-th particle swarm and the j-th particle; $l_i$ represents the minimum sailing distance of the i-th particle swarm; $t_i$ represents the minimum sailing time of the i-th particle swarm; tim represents the average minimum sailing time of the i cooperative swarm; $v_i$ represents the navigation speed of the i-th particle swarm; nn represents the number of cooperative swarms of the particle swarm.

In a specific embodiment, the collision optimization function value, the turning optimization function value, and the time optimization function are solved correspondingly, so as to obtain the corresponding independent fitness and facilitate the iterative update of the particles.

Figure 7:
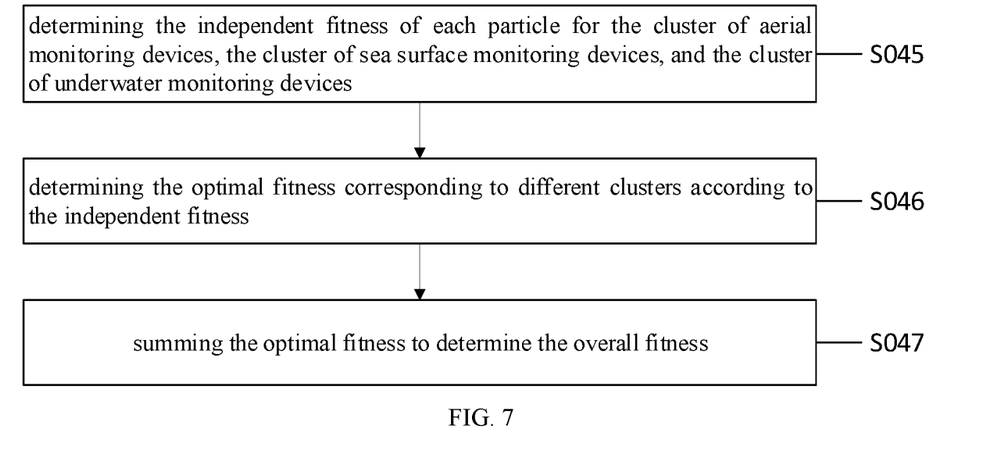
FIG. 7 is a schematic flowchart of an embodiment of calculating the overall fitness provided by this disclosure.

Preferably, as shown in FIG. 7, the calculation process of the overall fitness includes:

S045 determining the independent fitness of each particle for the cluster of aerial monitoring devices, the cluster of sea surface monitoring devices, and the cluster of underwater monitoring devices;

S046 determining the optimal fitness corresponding to different clusters according to the independent fitness;

S047 summing the optimal fitness to determine the overall fitness.

In a specific embodiment, in the particle iterative process, the overall fitness is used to realize the collaborative optimization of multiple particle swarms, which reduces the mutual interference of particles and avoids the optimization from falling into a local optimal solution.

This disclosure provides a path planning system and method for sea-aerial cooperative underwater target tracking. Firstly, the position information of the detection target is effectively acquired through the cluster of aerial monitoring devices, and the first path planning is carried out along the channel of sea surface monitoring devices to conduct navigation, and detecting water obstacles during the navigation process to build a water surface navigation map and feedback all obstacle information in the channel of sea surface monitoring device. Then, using the cluster of sea surface monitoring devices to receive the water surface navigation map transmitted by the cluster of aerial monitoring devices, and carrying out the second path planning along the channel of sea surface monitoring device until it reaches the adjacent area of the detected target based on the obstacle information, the target position information, and its own position information of water surface navigation map, and then the underwater environment in the adjacent area is further detected to construct and transmit the underwater obstacle map. Finally, using the cluster of underwater monitoring devices to receive the underwater obstacle map, continuing the third path planning to track to the position of the detection target based on the underwater obstacle information in the adjacent area of underwater obstacle map.

In the technical scheme of this disclosure, by dividing different vehicles into different particle swarms, sharing information with each other and synchronously iterative evolution, the path planning problem of cooperative tracking target among multiple heterogeneous vehicles, i.e., aerial monitoring devices, sea surface monitoring devices, and cluster of underwater monitoring devices, is solved. Specifically, it includes: using particle swarm algorithm to plan the path of aerial monitoring devices, and detecting obstacles in the navigation area of sea surface monitoring devices along the way to generate a complete channel of sea surface monitoring device obstacle distribution map; then the cooperative navigation path of cluster of sea surface monitoring device is planned by using the complete obstacle position information and the cooperative particle swarm algorithm. After the cluster of sea surface monitoring devices reach the planned position, they detect and generate the underwater navigation environment map, then plan the underwater path of the underwater vehicles, and release the underwater vehicles to complete the task of tracking the target. The technical scheme provided by this disclosure has flexible application scenarios and can effectively adapt to the unknown waterway; the collaborative particle swarm algorithm reduces the number of iterations and improves the efficiency of optimization; with reasonable path planning the target position can be quickly tracked; as a result, the autonomous cooperative tracking ability of heterogeneous unmanned equipment cluster in unknown obstacle waters is improved.

It is to be understood, however, that even though numerous characteristics and advantages of this disclosure have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A path planning system for sea-aerial cooperative underwater target tracking, comprising a cluster of aerial monitoring devices, a cluster of sea surface monitoring devices, and a cluster of underwater monitoring devices, wherein:

the cluster of aerial monitoring devices is used to obtain position information of a detection target, carry out a first path planning along a channel of the cluster of sea surface monitoring devices according to the position information of the detection target, construct a water surface navigation map including the position information of the detection target and information of all obstacles in the channel of the cluster of sea surface monitoring devices, and transmit the water surface navigation map to the cluster of sea surface monitoring devices, wherein the cluster of aerial monitoring devices is a cluster of unmanned aerial vehicles;

the cluster of sea surface monitoring devices is used to carry out a second path planning along the channel of the cluster of sea surface monitoring devices based on a cooperative particle swarm algorithm, according to the water surface navigation map and position information of the cluster of sea surface monitoring devices, reaching an adjacent area of the detection target, and to detect underwater environment of the adjacent area, construct an underwater obstacle map, and transmit the underwater obstacle map to the cluster of underwater monitoring devices, wherein the cluster of sea surface monitoring devices is a cluster of unmanned surface vehicles;

the cluster of underwater monitoring devices is used to perform a third path planning based on the cooperative particle swarm algorithm, according to the underwater obstacle map, and track to the detection target to complete a tracking task, wherein the cluster of underwater monitoring devices is a cluster of underwater vehicles;

wherein a first number of cooperative particle swarms of the cooperative particle swarm algorithm corresponding to the second path planning is equal to a number of the unmanned surface vehicles;

a second number of cooperative particle swarms of the cooperative particle swarm algorithm corresponding to the third path planning is equal to a number of the underwater vehicles;

wherein the path planning steps of the first path planning, the second path planning and the third path planning include:

obtaining initialization parameters, initializing a path point particle swarm, wherein the path point particle swarm includes the cluster of aerial monitoring devices corresponding to the first path planning, the cluster of sea surface monitoring devices corresponding to the second path planning, and the cluster of underwater monitoring devices corresponding to the third path planning;

obtaining set multiple iteration parameters and iteration times;

adding starting position coordinates and ending position coordinates to the path point particle swarm to determine an initial route coordinate matrix;

calculating an independent fitness and an overall fitness corresponding to the current position of each particle, and iterating and updating coordinate data of the path point particle according to the multiple iterative parameters, wherein the overall fitness is determined according to the independent fitness in the path point particle swarm; and ending the iteration, and outputting optimal path point coordinates when the number of iterations is reached to the set iteration times;

wherein the calculation process of the independent fitness includes:

determining corresponding collision optimization function value, turning optimization function value and time optimization function for a single path point particle; and performing a weighted sum of the collision optimization function value, the turning optimization function value, and the time optimization function to determine the independent fitness;

wherein the calculation process of the turning optimization function value includes:

for a single path point particle, calculating path angle, first distance, and limit turning radius according to every three adjacent path points, which are respectively expressed by the following formulas:

$$\alpha = \arccos \frac{l_1 + l_2 - l_3}{2l_1 \cdot l_2}$$

$$l = \min(l_1, l_2)$$

$$\rho = l \cdot \tan \frac{\alpha}{2}$$

where $\alpha$ represents the path angle determined by every three adjacent path points, l represents the first distance, $l_1$ represents distance between the first two path points, $l_2$ represents distance between the last two path points, $l_3$ represents distance between the first path point and the third path point, p represents the limit turning radius, which is maximum inscribed circle radius of the first distance l;

according to the limit turning radius and minimum turning radius of the sea surface monitoring device, determining the turning optimization function value, which is expressed by the following formula:

$$tu(p_{k-1}, p_k, p_{k+1}) = \begin{cases} 1 & \rho \geq R \\ 0 & \rho < R \end{cases}$$

where $tu(p_{k-1}, p_k, p_{k+1})$ represents the turning optimization function value, $p_{k-1}$, $p_k$, and $p_{k+1}$ represent three adjacent path points respectively, $\rho$ the limit turning radius, R represents the minimum turning radius, for a single path point particle, if at least one of the turning optimization function values takes a value of 0, the turning optimization function value corresponding to the single path point particle takes 0;

for the single path point particle, the corresponding time optimization function is expressed by the following formula:

$$l_{ij} = \sum_{k=1}^{dim+1} l_{ijk};$$

$$l_i = \min(l_{ij}), j = 1, \ldots, P$$

$$t_i = \frac{l_i}{v_i}; tim = \frac{\sum_{i=1}^{nn} t_i}{nn};$$

where $l_{ijk}$ represents distance between the i-th particle swarm, the j-th particle, and the k-th group of adjacent path points; $l_{ij}$ represents total path length of the i-th particle swarm and the j-th particle; $l_i$ represents minimum sailing distance of the i-th particle swarm; $t_i$ represents minimum sailing time of the i-th particle swarm; tim represents average minimum sailing time of the i cooperative swarm; $v_i$ represents navigation speed of the i-th particle swarm; and nn represents a number of cooperative swarms of the particle swarm.

2. A path planning method for sea-aerial cooperative underwater target tracking, based on the path planning system for sea-aerial cooperative underwater target tracking, comprising a cluster of aerial monitoring devices, a cluster of sea surface monitoring devices, and a cluster of underwater monitoring devices, the path planning method comprising:

obtaining position information of a detection target, carrying out a first path planning along a channel of the cluster of sea surface monitoring devices according to the position information of the detection target, and constructing a water surface navigation map including the position information of the detection target and information of all obstacles in the channel of the cluster of sea surface monitoring devices, and transmitting the water surface navigation map to the cluster of sea surface monitoring devices, wherein the cluster of aerial monitoring devices is a cluster of unmanned aerial vehicles;

carrying out a second path planning along the channel of sea surface monitoring device based on a cooperative particle swarm algorithm, according to the water surface navigation map and its own position information of the cluster of sea surface monitoring devices, reaching an adjacent area of the detection target, detecting underwater environment of the adjacent area, constructing an underwater obstacle map, and transmitting the underwater obstacle map to the cluster of underwater monitoring devices, wherein the cluster of sea surface monitoring devices is a cluster of unmanned surface vehicles;

performing a third path planning based on the cooperative particle swarm algorithm, according to the underwater obstacle map, and tracking to the detection target to complete a tracking task, wherein the cluster of underwater monitoring devices is a cluster of underwater vehicles;

wherein a first number of cooperative particle swarms of the cooperative particle swarm algorithm corresponding to the second path planning is equal to a number of the unmanned surface vehicles;

a second number of cooperative particle swarms of the cooperative particle swarm algorithm corresponding to the third path planning is equal to a number of the underwater vehicles;

wherein the path planning steps of the first path planning, the second path planning and the third path planning include:

obtaining initialization parameters, initializing a path point particle swarm, wherein the path point particle swarm includes the cluster of aerial monitoring devices corresponding to the first path planning, the cluster of sea surface monitoring devices corresponding to the second path planning, and the cluster of underwater monitoring devices corresponding to the third path planning;

obtaining set multiple iteration parameters and iteration times;

adding starting position coordinates and ending position coordinates to the path point particle swarm to determine an initial route coordinate matrix;

calculating an independent fitness and an overall fitness corresponding to the current position of each particle, and iterating and updating coordinate data of the path point particle according to the multiple iterative parameters, wherein the overall fitness is determined according to the independent fitness in the path point particle swarm;

ending the iteration, and outputting optimal path point coordinates when the number of iterations is reached to the set iteration times;

wherein the calculation process of the independent fitness includes:

determining corresponding collision optimization function value, turning optimization function value and time optimization function for a single path point particle; and performing a weighted sum of the collision optimization function value, the turning optimization function value, and the time optimization function to determine the independent fitness;

wherein the calculation process of the turning optimization function value includes:

for a single path point particle, calculating path angle, first distance, and limit turning radius according to every three adjacent path points, which are respectively expressed by the following formulas:

$$\alpha = \arccos\frac{l_1 + l_2 - l_3}{2l_1 \cdot l_2}$$

$$l = \min(l_1, l_2)$$

$$\rho = l \cdot \tan\frac{\alpha}{2}$$

where $\alpha$ represents the path angle determined by every three adjacent path points, l represents the first distance, $l_1$ represents distance between the first two path points, $l_2$ represents distance between the last two path points, $l_3$ represents distance between the first path point and the third path point, p represents the limit turning radius, which is maximum inscribed circle radius of the first distance l;

according to the limit turning radius and minimum turning radius of the sea surface monitoring device, determining the turning optimization function value, which is expressed by the following formula:

$$tu(p_{k-1}, p_k, p_{k+1}) = \begin{cases} 1 & \rho \geq R \\ 0 & \rho < R \end{cases}$$

where tu $tu(p_{k-1}, p_k, p_{k+1})$ represents the turning optimization function value, $p_{k-1}$, $p_k$, and $p_{k+1}$ represent three adjacent path points respectively, $\rho$ the limit turning radius, R represents the minimum turning radius, for a single path point particle, if at least one of the turning optimization function values takes a value of 0, the turning optimization function value corresponding to the single path point particle takes 0;

for the single path point particle, the corresponding time optimization function is expressed by the following formula:

$$l_{ij} = \sum_{k=1}^{dim+1} l_{ijk}; l_i = \min(l_{ij}), j = 1, \ldots, P$$

$$t_i = \frac{l_i}{v_i}; tim = \frac{\sum_{i=1}^{nn} t_i}{nn};$$

where $l_{ijk}$ represents distance between the i-th particle swarm, the j-th particle, and the k-th group of adjacent path points; $l_{ij}$ represents total path length of the i-th particle swarm and the j-th particle; $l_j$ represents minimum sailing distance of the i-th particle swarm; $t_i$ represents minimum sailing time of the i-th particle swarm; tim represents average minimum sailing time of the i cooperative swarm; $v_i$ represents navigation speed of the i-th particle swarm; and nn represents a number of cooperative swarms of the particle swarm.

3. The path planning method for sea-aerial cooperative underwater target tracking according to claim 2, wherein the step that obtaining position information of a detection target, carrying out a first path planning along a channel of the cluster of sea surface monitoring devices according to the position information of the detection target comprising the following steps:
 obtaining starting position of the cluster of aerial monitoring devices, channel information of the channel of the cluster of sea surface monitoring devices, and the tai=get position information of the detection target;
 determining a channel of the cluster of aerial monitoring devices according to the starting position, the channel information of the cluster of sea surface monitoring devices, and the target position information of the detection target, wherein the channel of the cluster of aerial monitoring devices is the navigable airspace corresponding to the channel of the cluster of sea surface monitoring devices; and
 carrying out the first path planning in the channel of the cluster of aerial monitoring devices, planning a navigation detection path of the cluster of aerial monitoring devices, and navigating.

4. The path planning method for sea-aerial cooperative underwater target tracking according to claim 3, wherein the step that constructing a water surface navigation map including the position information of the target position and information of all obstacles in the channel of the cluster of sea surface monitoring devices, and transmitting the water surface navigation map to the cluster of sea surface monitoring devices comprising the following steps:
 during navigation of the cluster of aerial monitoring devices, detecting water surface by a detection device in the channel of the cluster of aerial monitoring devices, collecting the information of all obstacles that is stored as coordinate data information along the channel of the cluster of sea surface monitoring devices; and
 constructing the water surface navigation map according to the coordinate data information and the position of the detection target, and transmitting the water surface navigation map to the cluster of sea surface monitoring devices.

5. The path planning method for sea-aerial cooperative underwater target tracking according to claim 2, wherein the initialization parameters include number of cooperative particle swarms, particle swarm's size, particle dimension and initial velocity; the parameters include channel space range, inertia factor, individual learning factor and group learning factor;
 the step iterating and updating coordinate data of the path point particle according to the multiple iterative parameters includes the following steps:
 updating velocity of the path point particle according to the channel space range, the inertia factor, the individual learning factor, and the group learning factor; and
 updating coordinates of the path point particle according to the updated velocity and current coordinate position of the particle.

6. The path planning method for sea-aerial cooperative underwater target tracking according to claim 5, wherein the inertia factor decreases uniformly with the increase of the number of iterations, which is expressed by the following formula:

$$\omega_t = \omega_{t-1} - \frac{\omega_{max} - \omega_{min}}{g}$$

where t represents current iteration number, $\omega_t$ represents inertia factor corresponding to the current iteration number, $\omega_{t-1}$ represents inertia factor corresponding to the previous iteration number, $\omega_{max}$ represents maximum value corresponding to the preset inertia factor, $\omega_{min}$ represents minimum value corresponding to the preset inertia factor, g represents preset constant.

7. The path planning method for sea-aerial cooperative underwater target tracking according to claim 2, wherein the calculation process of the overall fitness includes:
 determining the independent fitness of each particle for the cluster of aerial monitoring devices, the cluster of sea surface monitoring devices, and the cluster of underwater monitoring devices;
 determining an optimal fitness corresponding to different clusters according to the independent fitness; and
 summing the optimal fitness to determine the overall fitness.

\* \* \* \* \*